July 25, 1961  J. D'ARRIGO  2,993,661
FISH LINE RE-REELING ADAPTER
Filed Dec. 29, 1958

INVENTOR.
JOSEPH D'ARRIGO
BY
ATTORNEY

United States Patent Office 2,993,661
Patented July 25, 1961

2,993,661
FISH LINE RE-REELING ADAPTER
Joseph D'Arrigo, 113 Fountain St., Syracuse, N.Y.
Filed Dec. 29, 1958, Ser. No. 783,485
2 Claims. (Cl. 242—106)

This invention relates to an adapter to facilitate re-reeling of fish line from a supply spool to the usual reel attached to the fish pole, and more particularly to an adapter adapted to be attached to the tip end of a fish pole so that threading through the fish pole eyes may be effected.

In transferring fish line from a storage or commercial package supply spool, it is desirable that the line be drawn from such spool tangentially so that transference to the usual reel attached to the pole may be effected without inducing kinks, or entanglement through convolutions which would produce a twist in the line. It is further desirable that in transferring the line to the usual reel, that the line be drawn through the sequence of eyes, along the pole, so that upon nearing the completion of the line transfer operation, the line will be threaded through the eyes, and the end be ready for receiving the leader, snell or other snare to be employed in fishing. By such procedure, maximum protection against line entanglement is assured.

The present invention is directed to an adapter for holding a spare supply of fish line in spool form for tangential unwinding thereof, adjacent the end of a fully assembled fish pole, whereby such line may, in transference to the normal fish pole reel, be drawn in a normal manner along the pole through all of the eyes thereof. It is further directed to an adapter capable of being quickly clipped on or removed from the end of a fish pole, and having provision for holding a supply spool in tangential relation with the end eye of the pole. Further, the invention is directed to a simple low cost construction, affording application of slight friction to a spool supported thereon, to control the tension of the line during transference thereof from the spool to the pole reel.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

In the drawings, wherein like reference characters indicate like parts:

Figure 1:
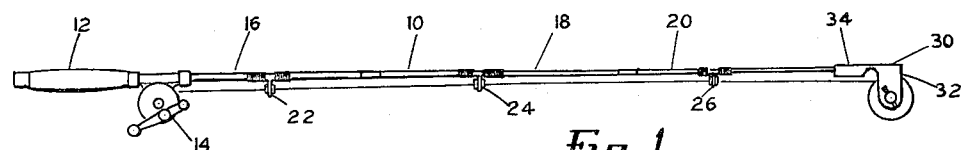
FIGURE 1 is a side elevational view of a fish pole having the adapter applied to one end thereof.
Figure 2:
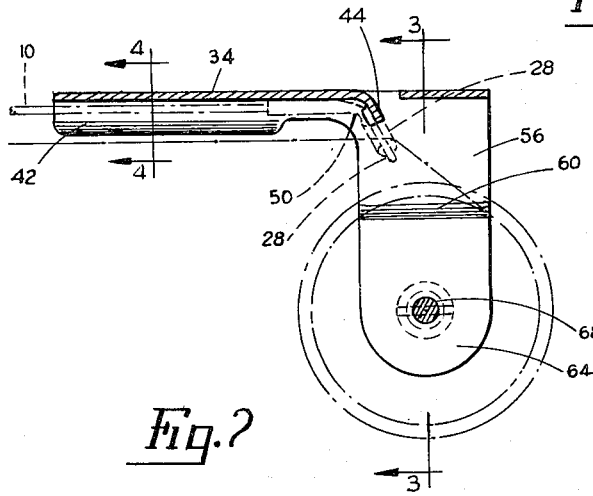
FIGURE 2 is an enlarged longitudinal sectional view of the adapter, the section being taken substantially on the line 2—2 of FIGURE 3.
Figure 3:
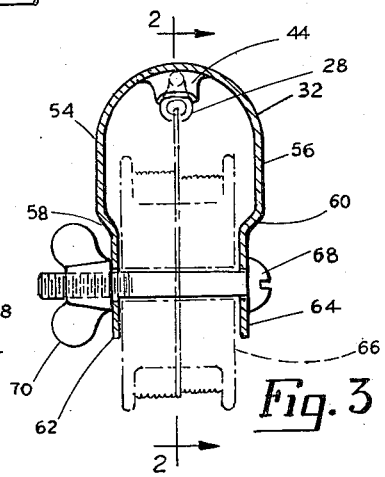
FIGURE 3 is a transverse sectional view taken substantially on the line 3—3 of FIGURE 2.
Figure 5:
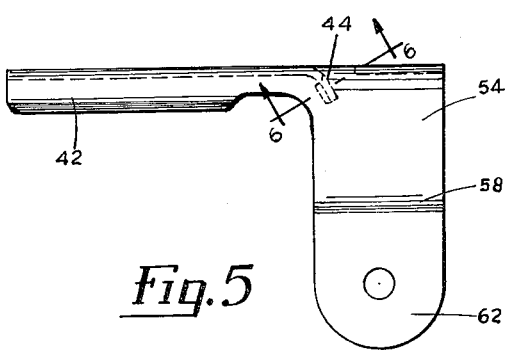
FIGURE 5 is a side elevational view of the adapter.
Figure 4:
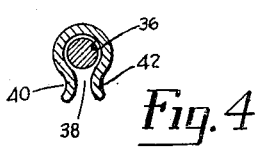
FIGURE 4 is a transverse sectional view taken on the line 4—4 of FIGURE 2.
Figure 6:
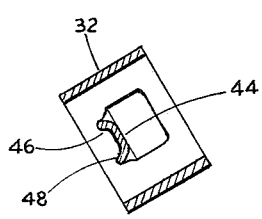
FIGURE 6 is a sectional detail taken substantially on the line 6—6 of FIGURE 5.

Referring to FIGURE 1, there is shown a fish pole 10 having the usual handle 12, and a reel 14 affixed thereto. The pole may be in detachable sections such as 16, 18 and 20 as will be understood in the art, or may be one piece. Along the length of the pole are a plurality of eyes 22, 24, 26 and an end eye 28 adapted to guide the fish line (see FIGURES 2 and 3). Disposed over the thin flexible end section 20 of the pole is a fish line spool adapter 30.

The adapter 30 is formed of light resilient sheet metal or other suitable material, bent to form an inverted U 32, at one end to receive a spool, and having at its other end a resilient channel clip structure generally indicated at 34, extending laterally from the loop of the U 32 and adapted to clip over the end of the end section 20 of the pole. The clip portion has a circular section 36 which may closely embrace the tip end of the pole, and an entrance for the pole end as at 38, with flared yielding flanges 40 and 42, which may be readily and yieldingly and resiliently spread apart to clip over the pole end.

In order to position the adapter lengthwise upon the pole's end, an instruck finger 44 having side flanges 46 and 48 is provided. Such finger is adapted to engage the pole tip end 50, with its eye 28, so that the adapter will be located in a correct position. Such finger withstands any thrust due to tension on the fish line during the re-reeling operation.

The depending arms 54 and 56 of the U section are offset inwardly as at 58 and 60, to provide spaced pads 62 and 64, between which is positioned a supply spool 66. A bolt, 68, having an adjustable wing nut 70 forms a bearing or center shaft for the spool, and by adjusting the wing nut, the pads 62 and 64 may be brought into light frictional engagement with the side faces of the spool, to provide any desired amount of friction against the free running of the spool within the adapter.

In practice, it will be understood that when it is desired to transfer fish line to the usual reel 14, the supply spool is placed between the arms 54 and 56 and the bolt 68 inserted, and the wing nut 70 applied. The free end of the line may be tied to the old line extending to the reel 14, or if there be no line on reel 14, the free end may be threaded through the eyes 28, 26, 24 and 22 and attached to the reel 14. The adapter is then clipped over the pole end, and such friction as is desirable applied to the spool by adjusting the wing nut 70. In some instances it may be desirable to apply no friction to the spool, but a little friction prevents the spool from "coasting" with the chance of entanglement. If the re-reeling operation is to be performed at a later time, it may be desirable to draw the wing nut sufficiently tight to act as a brake and prevent rotation of the spool.

As the end of the line appears on the spool or after such length is withdrawn therefrom as desired, re-reeling is discontinued, the adapter detached from the pole end, and the remainder of the line if any, is severed from the portion extending through the eyes to the reel 14. Thus the line leading to reel 14 is threaded through the eyes, and the end thereof beyond the eye 28 is ready to have a leader or snare attached to the end thereof. It will be appreciated that the adapter eliminates the chance of line entanglement and provides for true tangential delivery, with complete avoidance of the chance of convolution kinks and the like.

Although a single embodiment of the invention has been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A fish line re-reeling adapter comprising a U shaped member formed of sheet material having a center portion and spaced arms for the reception of a fish line supply spool between said arms, a shaft extending between said arms, and adapted to form a journal for a spool disposed between said arms, manually adjustable means for contracting the spacing between said arms to frictionally engage a spool lying therebetween, channel sectioned means extending tangentially in respect to the axis of said shaft from one side of said center portion and adapted to embrace the tip end portion of a fish pole, said channel sectioned means having flared yielding flanges to provide a clip adjacent the free end of the channel means for detachable attachment to the end portion of a fish pole adjacent the tip end thereof, and tongue means inwardly struck from within the U shaped member for engaging the end tip of a fish pole when held in said clip to position the adapter upon a fish pole end.

2. A fish line re-reeling adapter comprising a U shaped member formed of sheet material having a center portion and spaced arms for the reception of a fish line supply spool between said arms, a shaft extending between the arms, and adapted to form a journal for a spool disposed between said arms, said arms being offset inwardly toward each other in the region adjacent said shaft to provide spool engaging friction pads, and said shaft having manually adjustable means for contracting the spacing of said pads to frictionally engage a spool lying therebetween, channel sectioned means extending tangentially in respect to the axis of said shaft from one side of said center portion, said channel sectioned means having flared yielding flanges to provide a clip adjacent the free end of the channel means for detachable attachment to the end portion of a fish pole adjacent the tip end thereof, and tongue means inwardly struck from within the U-shaped member for engaging the end tip of a fish pole when held in said clip to position the adapter upon the fish pole end.

References Cited in the file of this patent

UNITED STATES PATENTS

| 1,620,590 | Betts | Mar. 8, 1927 |
| 2,525,948 | Ruiz | Oct. 17, 1950 |
| 2,608,015 | Peterson | Aug. 26, 1952 |
| 2,702,960 | Weaver | Mar. 1, 1955 |
| 2,817,177 | Spartz | Dec. 24, 1957 |

FOREIGN PATENTS

| 971,788 | France | Aug. 16, 1950 |